(12) United States Patent
Yamada

(10) Patent No.: US 7,914,002 B2
(45) Date of Patent: Mar. 29, 2011

(54) AUTOMATIC DOCUMENT FEEDER AND IMAGE FORMING APPARATUS EQUIPPED THEREWITH

(75) Inventor: Masayuki Yamada, Osaka (JP)

(73) Assignee: Kyocera Mita Corporation (JP)

(*) Notice: Subject to any disclaimer, the term of this patent is extended or adjusted under 35 U.S.C. 154(b) by 209 days.

(21) Appl. No.: 11/646,061

(22) Filed: Dec. 27, 2006

(65) Prior Publication Data

US 2007/0145662 A1 Jun. 28, 2007

(30) Foreign Application Priority Data

Dec. 28, 2005 (JP) .................................. 2005-378605

(51) Int. Cl.
B65H 5/00 (2006.01)
(52) U.S. Cl. ........................................ 271/264; 399/367
(58) Field of Classification Search .................. 271/267, 271/264; 399/367
See application file for complete search history.

(56) References Cited

U.S. PATENT DOCUMENTS

| 5,090,682 A * | 2/1992 | Takimoto | 271/225 |
| 6,618,575 B2 * | 9/2003 | Takida et al. | 399/367 |
| 7,380,787 B2 * | 6/2008 | Fukumura | 271/264 |
| 7,392,009 B2 * | 6/2008 | Iwago | 399/367 |
| 2004/0004320 A1 * | 1/2004 | Watanabe et al. | 271/10.01 |
| 2004/0253030 A1 * | 12/2004 | Hamada et al. | 399/367 |
| 2005/0195450 A1 * | 9/2005 | Shoji | 358/497 |
| 2006/0013627 A1 * | 1/2006 | Choi | 399/367 |

FOREIGN PATENT DOCUMENTS

| JP | 3-36151 | 2/1991 |
| JP | 2001-194835 | 7/2001 |
| JP | 2003-87510 | 3/2003 |

* cited by examiner

*Primary Examiner* — Stefanos Karmis
*Assistant Examiner* — Ernesto Suarez
(74) *Attorney, Agent, or Firm* — Gerald E. Hespos; Michael J. Porco

(57) ABSTRACT

Disclosed is an automatic document feeder for feeding a document to a document read surface. The document feeder has a first carrying mechanism for feeding a document toward the document read surface, a document leading mechanism for leading the document after passing above the document read surface, a second carrying mechanism for carrying the document led by the document leading mechanism, in a downstream direction, and a housing equipped with the first carrying mechanism, the document leading mechanism and the second carrying mechanism. The housing can be opened and closed relative to the document read surface. The document leading mechanism includes a movable member having an inclined surface that extends obliquely downward to direct a distal edge thereof toward the document read surface. The movable member can maintain the distal edge of the inclined surface at a substantially constant height relative to the document read surface.

10 Claims, 7 Drawing Sheets

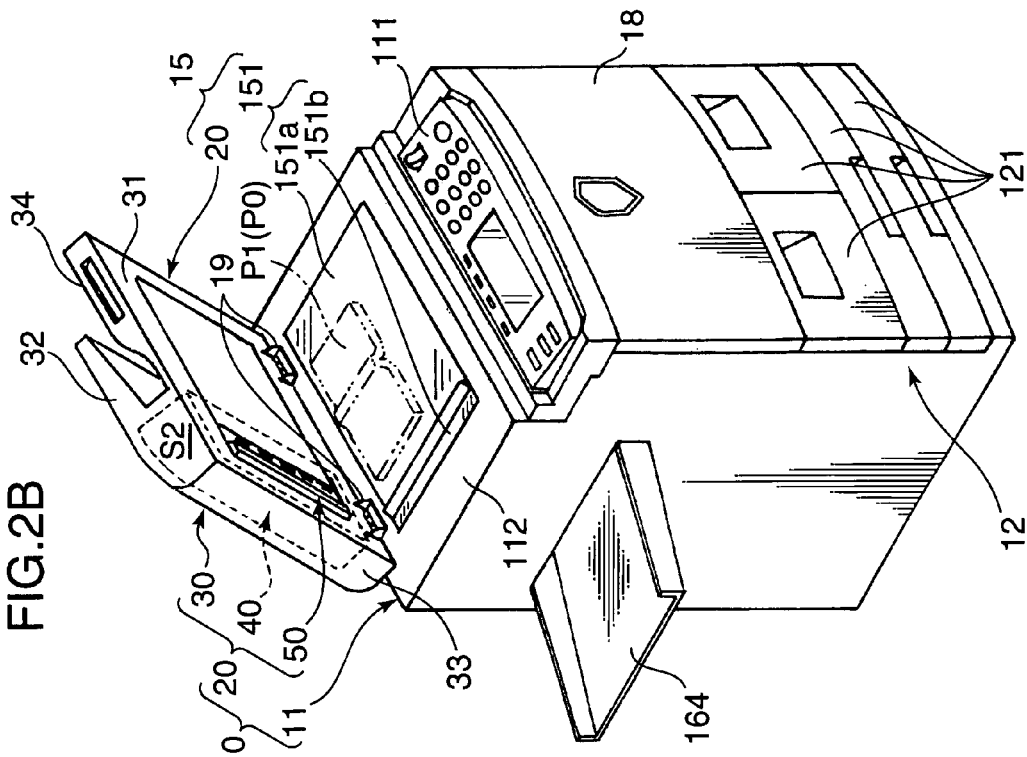
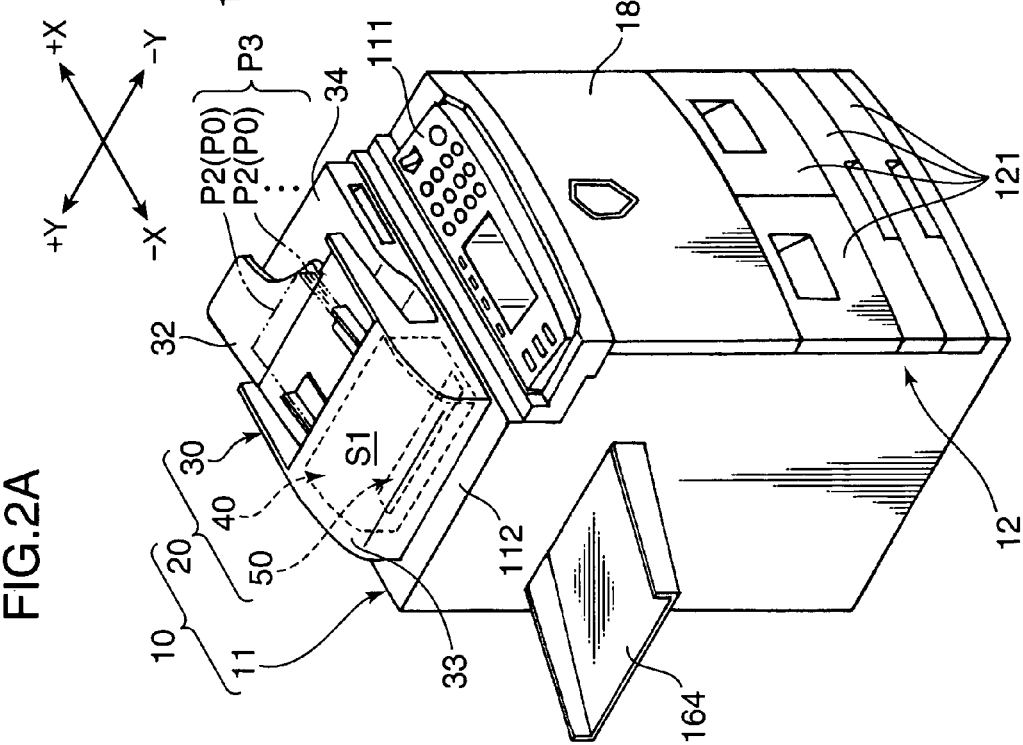

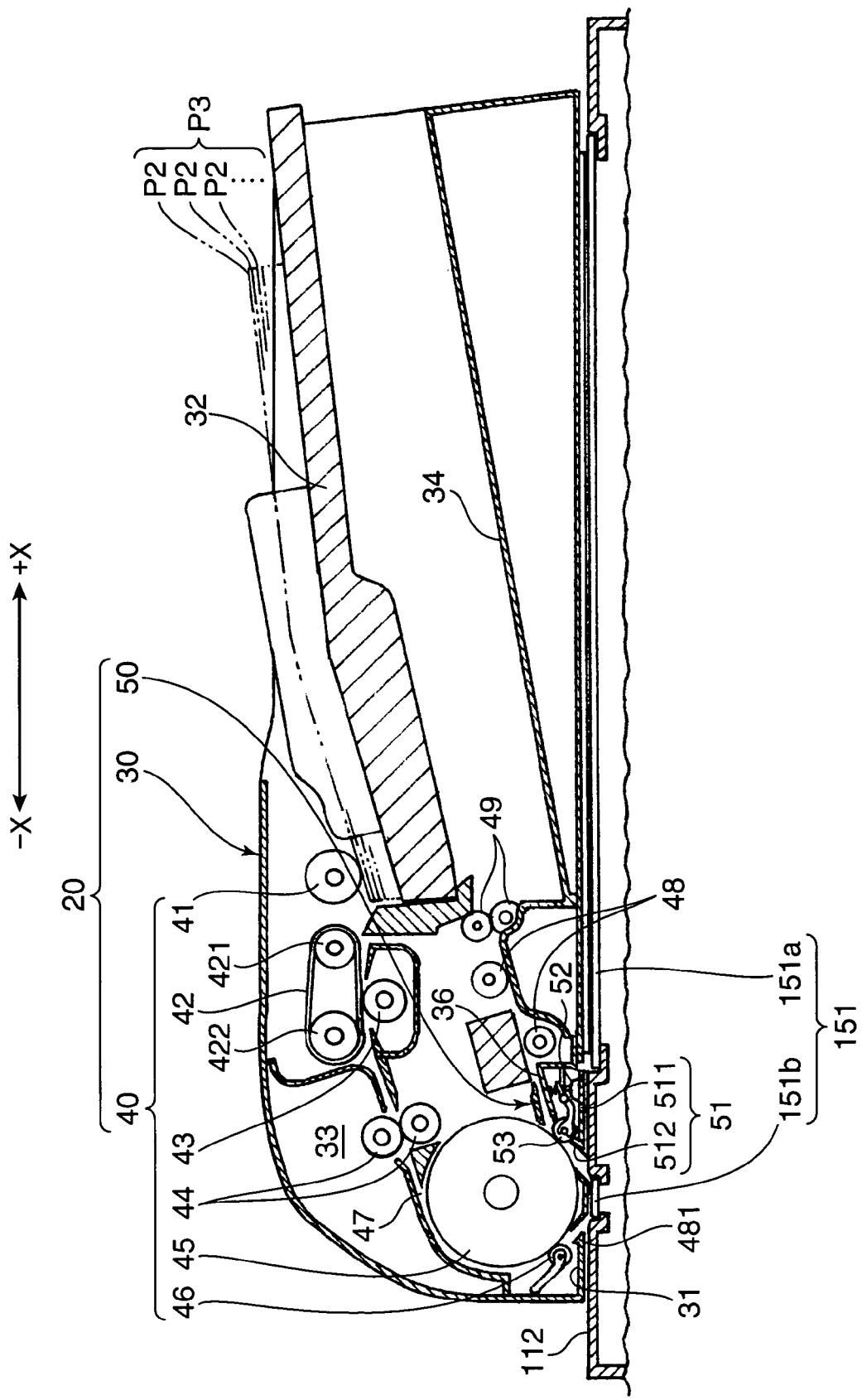

AUTOMATIC DOCUMENT FEEDER AND IMAGE FORMING APPARATUS EQUIPPED THEREWITH

BACKGROUND OF THE INVENTION

1. Field of the Invention

The present invention relates to an automatic document feeder designed to automatically feed a document toward a document read surface so as to read an image of the document, and an image forming apparatus equipped with the automatic document feeder.

2. Description of the Related Art

Heretofore, there has been known an automatic document feeder as disclosed in Japanese Patent Laid-Open Publication No. 2003-87510. This automatic document feeder is adapted to be used with an image forming apparatus, such as a copy machine or a facsimile machine, which is designed to read an image from a document. The automatic document feeder comprises a housing adapted to openably/closably cover a platen (contact glass) disposed on a top surface of a body of the image forming apparatus, a document tray attached to an upper portion of the housing and adapted to place thereon a stack of documents, a document feeding mechanism adapted to feed the documents one-by-one from the document tray and lead the document onto the contact glass, and a catch tray adapted to receive the document after being fed on the contact glass by the document feeding mechanism and then subjected to an optical reading operation of reading an image thereon using an optical system unit. The catch tray is disposed in the housing at a position below and opposed to the document tray.

The housing is provided with a restriction member adapted to press the document being passing above the contact glass, against the contact glass, so as to restrict floating of the document. Further, a Mylar sheet is attached to a bottom surface of the restriction member. A leading member and a guide plate are disposed on a downstream side of the contact glass in this order in such a manner as to form an inclined surface which extends upwardly in a downstream direction to lead the document to the catch tray therealong. The Mylar sheet is disposed to extend up to a top surface of the guide plate.

Thus, after passing above the contact glass while being sandwiched between the contact glass and the restriction member through the Mylar sheet, the document passes between the leading member and the Mylar sheet, and then travels between the Mylar sheet and the guide plate while being sandwiched therebetween. Finally, the document is ejected into the catch tray. The guide plate is positioned to have an upstream end located below a downstream end of the inclined surface of the leading member, so that the document after passing above the leading member is reliably guided to the top surface of the guide plate.

In the Japanese Patent Laid-Open Publication No. 2003-87510, it is described that the Mylar sheet arranged on the bottom surface of the restriction member makes it possible to stabilize a document carrying speed by preventing occurrence of a problem that the document flutters on the contact glass, so as to provide a stable carrying state of the document to avoid warping or distortion in a read image.

Generally, a housing adapted to openably/closably cover a contact glass is mounted to an apparatus body in such a manner as to be swingably moved in open and closed directions about a hinge plate. The hinge plate is typically provided with bias means, such as a plate spring, to facilitate an open movement of the housing, so that the housing is biased in the open direction by a biasing force of the bias means. In reality, fluctuation in the biasing force of the bias means or pinching of foreign matters is likely to cause variations in surface contact of the housing with the contact glass.

Reviewing the automatic document feeder disclosed in Japanese Patent Laid-Open Publication No. 2003-87510 from the above standpoint, the guide plate for leading the document is fixed to the housing, and thereby it is unable to cope with the variations in surface contact of the housing with the contact glass. Thus, if the housing is located opposed to the contact glass to slightly lift the guide plate, the document is likely to collide with an upstream edge of the guide plate. In the worst case, the document gets into a gap between the guide plate and the contact glass to cause a problem of precluding the document from being adequately carried.

Conversely, if the housing is slightly lowered relative to its normal position, the guide plate is likely to collide with the top surface of the apparatus body when the housing is fully closed, to cause a problem about damages in the guide plate or the top surface of the apparatus body.

SUMMARY OF THE INVENTION

It is an object of the present invention to provide an automatic document feeder capable of keeping a guide plate and a top surface of an apparatus body from being damaged, and allowing a document after passing above the contact glass to be highly reliably fed toward a catch tray, and an image forming apparatus equipped with the automatic document feeder.

In order to achieve the above object, according to one aspect of the present invention, there is provided an automatic document feeder for feeding a document to a document read surface, which comprises a first carrying mechanism for feeding a document toward the document read surface, a document leading mechanism for leading up the document after passing above the document read surface, a second carrying mechanism for carrying the document led by the document leading mechanism, in a downstream direction, and a housing equipped with the first carrying mechanism, the document leading mechanism and the second carrying mechanism, and adapted to be selectively opened and closed relative to the document read surface. The document leading mechanism includes a movable member having an inclined surface which extends obliquely downward in such a manner as to direct a distal edge thereof toward the document read surface. The movable member is adapted to maintain the distal edge of the inclined surface at a substantially constant height level relative to the document read surface.

BRIEF DESCRIPTION OF THE DRAWINGS

FIGS. 2A and 2B are perspective views showing an external appearance of the image forming apparatus illustrated in FIG. 1, wherein FIG. 2A shows a state after the automatic document feeder is set at a fully-closed position where it is fully closed to cover over a contact glass, and FIG. 2B shows a state after the automatic document feeder is set at a fully-opened position where it is fully opened to uncover the contact glass.

FIG. 3 is a front sectional view showing the automatic document feeder according the embodiment.

FIGS. 6A and 6B are explanatory diagrams of an operation of the document leading mechanism in FIG. 4, wherein FIG. 6A shows a state when a leading member is mounted at a normal height level, and FIG. 6B shows a state when the leading member is mounted at a position lower than the normal height level due to a mounting error.

DETAILED DESCRIPTION OF THE PREFERRED EMBODIMENTS

Figure 1:
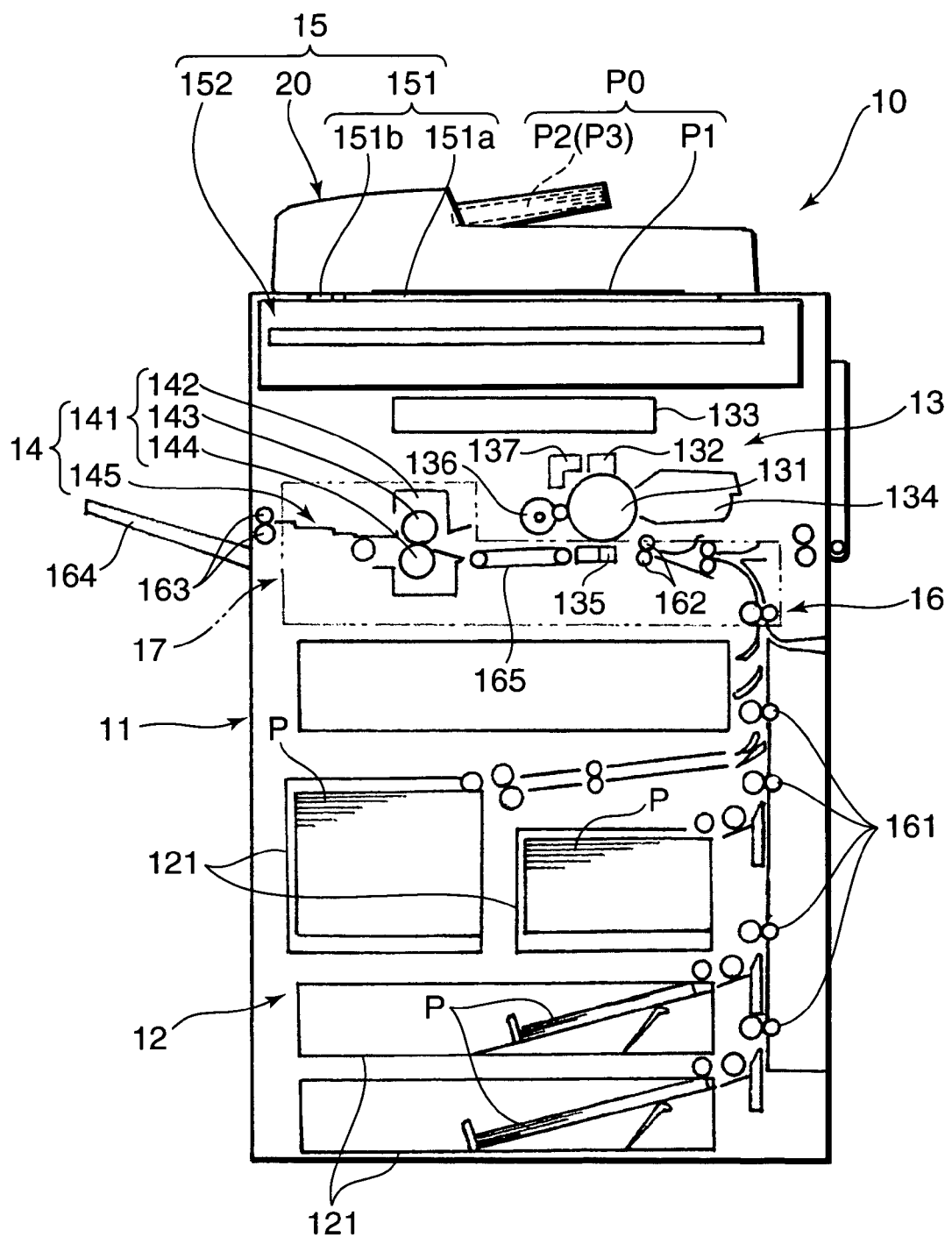
FIG. 1 is an explanatory diagram schematically showing an internal structure of an image forming apparatus equipped with an automatic document feeder according one embodiment of the present invention.

FIG. 1 is an explanatory diagram schematically showing an internal structure of an image forming apparatus equipped with an automatic document feeder according one embodiment of the present invention. In this embodiment, a copy machine is taken as one example of an image forming apparatus 10.

The image forming apparatus 10 has a basic structure which comprises a sheet feed section 12 arranged in a lower region of a box-shaped apparatus body 11, an image forming section 13 arranged above the sheet feed section 12, a fixing section 14 arranged on a left (in FIG. 1) side of the image forming section 13, an image reading section 15 arranged in an upper region of the apparatus body 11, and a sheet transport section 16 extending from the sheet feed section 12 to a sheet ejection region via the image forming section 13 and the fixing section 14.

The sheet feed section 12 is operable to feed sheets P one-by-one from a stack of sheets stackingly placed on a sheet cassette 121, to the sheet transport section 16. The sheet transport section 16 is operable to transport the sheet P fed from the sheet feed section 12, toward the image forming section 13 through a transport roller pair 161 and a registration roller pair 162. Then, the sheet transport section 16 is operable to transport the sheet P to pass through the image forming section 13 and the fixing section 14, and then eject the sheet P toward a catch tray 164 attached to an outer wall of the apparatus body 11 by driving of an ejection roller pair 163.

The image forming section 13 is operable to transfer a given toner image onto the sheet P through an electrophotographic process. The image forming section 13 comprises a photosensitive drum 131 adapted to be rotated about an axis thereof, and a plurality of other components including an electrostatic charger unit 132, an exposure unit 133, a development unit 134, a transfer unit 135, a cleaner 136 and a charge removal unit 137, which are disposed around the photosensitive drum 131 along a rotation direction thereof.

The charger unit 132 is operable to provide a given potential onto a surface of the photosensitive drum 131 by corona discharge. The exposure unit 133 is operable to emit a laser light onto the photosensitive drum 131 based on document image data read by the image reading section 15 so as to selectively lower a potential of the surface of the photosensitive drum 131 to form an electrostatic latent image on the surface of the photosensitive drum 131. The development unit 134 is operable to develop the electrostatic latent image using toner particles so as to form a toner image on the surface of the photosensitive drum 131. The transfer unit 135 is operable to transfer the toner image on the surface of the photosensitive drum 131 to the sheet P. The cleaner 136 is operable to perform a cleaning operation of removing toner remaining on the surface of the photosensitive drum 131. The charge removal unit 137 is operable to remove charges remaining on the surface of the photosensitive drum 131.

The fixing section 14 is operable to perform an operation of fixing the toner image transferred onto the sheet P by the image forming section 13. Specifically, the fixing section 14 includes a fixing unit 141 disposed on a downstream side of the image forming section 13 in a sheet transport direction, and a cover unit 145 disposed on the downstream side of the fixing unit 141 and adapted to guide the sheet P discharged from the fixing unit 141, toward the ejection roller pair 163. The fixing unit 141 includes a box-shaped fixing-unit body 142, a heating roller 143 supported by the fixing-unit body 142 rotatably about an axis thereof, and a pressing roller 144 in press contact with an outer peripheral surface of the heating roller 143.

The sheet P transported from the image forming section 13 is moved according to rotations of the heating and pressing rollers 143, 144 while being pressed and nipped by a nip zone defined between the heating and pressing rollers 143, 144. During this movement, an operation of fixing the toner image onto the sheet P is performed based on heat applied from the heating roller 143 to the sheet P. Then, the sheet P is ejected toward the catch tray 164 through the cover unit 145 and the ejection roller pair 163.

In this embodiment, a major part of the sheet transport section 16, the registration roller pair 162, the ejection roller pair 163 and the fixing section 14, are formed as a sheet transport unit 17 adapted to be detachably inserted into a region of the apparatus body 11 indicated by the two-dot chain line in FIG. 1. The reason why the sheet transport unit 17 is designed to be detachably inserted into the apparatus body 11 is to facilitate an operation for solving a sheet jam and various maintenance operations by drawing the sheet transport unit 17 from the apparatus body 11 during such operations.

The image reading section 15 comprises a contact glass (document read surface) 151 fitted into a rectangular-shaped opening formed in a top portion of the apparatus body 11, an optical system unit 152 adapted to read a document image of a document P0 on the contact glass 151 ["manual load document P1" or "automatic feed document" (hereinafter referred to as "auto-feed document P2")], an automatic document feeder 20 adapted to feed auto-feed documents P2 one-by-one from a stack of auto-feed documents P2 (document stack P3) loaded on an after-mentioned document tray 32 (see FIGS. 2A and 2B) and lead the auto-feed document P2 to the contact glass 151.

The optical system unit 152 is operable to emit light from a light source (not shown) onto a document surface of the document P0 through the contact glass 151, and lead resulting reflected light to a CCD (charge coupled device) provided in a photoelectric conversion section, through a given mirror, so as to read image information on the document. The image information read by the CCD is converted to a digital signal and then transmitted to the exposure unit 133.

FIGS. 2A and 2B are perspective views showing an external appearance of the image forming apparatus 10 illustrated in FIG. 1, wherein FIG. 2A shows a state after the automatic document feeder 20 is set at a fully-closed position S1 where it is fully closed to cover over the contact glass 151, and FIG. 2B shows a state after the automatic document feeder 20 is set at a fully-opened position S2 where it is fully opened to uncover the contact glass 151. In FIGS. 2A and 2B, the X-X direction will be referred to as "lateral direction", and the Y-Y direction will be referred to as "longitudinal direction". More specifically, the −X direction and the +X direction will be referred to respectively as "leftward" and "rightward", and −Y direction and the +Y direction will be referred to respectively as "frontward" and "rearward".

As shown in FIG. 2A, in the image forming apparatus 10, the apparatus body 11 has a vertically-long rectangular parallelepiped shape, and the sheet feed section 12 arranged in the lower region of the apparatus body 11 is provided with a plurality of the sheet cassettes 121. Each of the sheet cassettes 121 is designed to be drawable frontwardly. A manual operation panel 111 including a numeric keypad, a liquid-crystal display and various operation keys is disposed on a frontward region of a top plate 112 of the apparatus body 11. The automatic document feeder 20 adapted to openably/closably cover the contact glass 151 (FIG. 1) is attached to the top plate 112.

An openable/closable front cover 18 is disposed to define a part of a front surface of the apparatus body 11 located above the sheet feed section 12. As shown in FIGS. 2A and 2B, this front cover 18 is usually closed, and opened in either one of rightward, leftward and downward directions during an operation for solving a sheet jam and various maintenance operations.

As shown in FIG. 2B, the contact glass 151 includes a large rectangular-shaped document mounting glass 151a disposed in a central region of a top surface of the apparatus body 11, and a longitudinally-long automatically-document-reading glass 151b disposed on a left side of and in adjacent relation to the document mounting glass 151a. Typically, a relatively thick document P0 (manual load document P1), such as a book document, is manually placed on the document mounting glass 151a in such a manner that a document surface of the document P0 is oriented downwardly. Specifically, after the automatic document feeder 20 is set at the fully-opened position S2, a manual load document P1 is placed on the document mounting glass 151a (FIG. 2B). Then, the automatic document feeder 20 is set at the fully-closed position S1 (FIG. 2A), and a document image of the manual load document P1 is read by a scanning operation of the optical system unit 152 (FIG. 1).

Differently, the automatically-document-reading glass 151b is disposed to allow a document P0 automatically fed from the automatic document feeder 20 (auto-feed document P2) to pass thereabove. Thus, when the auto-feed document P2 is passing above the automatically-document-reading glass 151b, a document image on a document surface of the auto-feed document P2 is read by the optical system unit 152. A document to be placed on the document mounting glass 151a is not limited to the relatively thick document P0, such as a book document, but a single document having a sheet shape may be placed thereon.

The automatic document feeder 20 comprises a housing 30, a document feeding mechanism 40 and a document leading mechanism 50. The housing 30 is adapted to swingingly moved in opposite directions about a pair of right and left hinge plates 19 attached along a rear edge of the top plate 112 of the apparatus body 11. The document feeding mechanism 40 is housed in the housing 30. The document leading mechanism 50 is operable to lead up an auto-feed document P2 fed to the automatically-document-reading glass 151b by the document feeding mechanism 40, at a position on a downstream side of the glass 151b.

The housing 30 includes a document tray 32 which is located above a rectangular-shaped bottom plate 31 having an area slightly greater than that of the contact glass 151, and adapted to place thereon a document stack P3, a case portion 33 receiving therein the document feeding mechanism 40, and a catch tray 34 adapted to receive an auto-feed document P2 ejected after being subjected to a document-image reading operation.

The case portion 33 is formed on the bottom plate 31 at a position on a leftward side relative to a central region of the bottom plate 31. The document tray 32 is formed to protrude rightwardly from an upper region of a right surface of the case portion 33, and the catch tray 34 is formed to extend rightwardly from a lower region of the right surface of the case portion 33. In the state after the automatic document feeder 20 is set at the fully-closed position S1, an auto-feed document P2 fed from the document tray 32 is subjected to the document-image reading operation, and then ejected toward the catch tray 34.

FIG. 3 is a front sectional view showing the automatic document feeder 20 according to the embodiment. Based on FIG. 3, the document feeding mechanism 40 of the automatic document feeder 20 will be specifically described below. As with FIGS. 2A and 2B, the X-X direction in FIG. 3 is defined as follows: −X: "leftward" and +X: "rightward".

As shown in FIG. 3, the document feeding mechanism 40 includes a pickup roller (a part of first carrying mechanism) 41, a feed belt 42, a feed roller 43, a relay roller pair 44, a registration roller (a part of first carrying mechanism) 45 and a positioning roller 46.

The pickup roller 41 is operable to pick up auto-feed documents P2 one-by-one from a document stack P3 placed on the document tray 32. The feed belt 42 is disposed on an immediate downstream side (leftward side) of the pickup roller 41. The feed roller 43 is disposed immediately below and in contact with the feed belt 42 in a driven manner. The relay roller pair 44 is disposed on a downstream side of the feed belt 42 and the feed roller 43. The registration roller 45 is a relatively-large circular-shaped roller disposed on a left and lower side relative to the relay roller pair 44. The positioning roller 46 is a relatively-small circular-shaped roller disposed such that an outer peripheral surface thereof is in contact with an outer peripheral surface of the registration roller 45 at a position on a left and lower side relative to the registration roller 45.

The feed belt 42 is wound around and between a drive roller 421 disposed on an immediate downstream side of the pickup roller 41 and a driven roller 422 disposed on a downstream side of and in opposed relation to the drive roller 421, in a tensioned manner. The feed belt 42 is circulated between the drive roller 421 and the driven roller 421 in a counterclockwise direction according to a driving rotation of the drive roller 421.

A document feed path 47 is formed inside the case portion 33 of the housing 30 along the pickup roller 41, the feed belt 42, the feed roller 43, the relay roller pair 44 and the registration roller 45. An auto-feed document P2 picked up and fed from the document stack P3 by the pickup roller 41 is carried toward a nip zone defined between the registration roller 45 and the positioning roller 46 in a stopped state, through the document feed path 47.

The registration roller 45 is adapted to be activated in synchronization with the document-image reading operation of the optical system unit 152 through the automatically-document-reading glass 151b. Thus, in response to the activation of the registration roller 45, the auto-feed document P2 stopped just before the nip zone defined between the registration roller 45 and the positioning roller 46 is carried toward the automatically-document-reading glass 151b in such a manner as to be synchronized with a reading/scanning operation of the optical system unit 152. Then, when the auto-feed document P2 passes above the automatically-document-reading glass 151b, image information on a document surface of the auto-feed document P2 is read.

After the image information on the document surface is read by the optical system unit 152, the auto-feed document P2 is led up by the document leading mechanism 50, and ejected to the catch tray 34 through a given idle roller 48 and an ejection roller pair (a part of second carrying mechanism) 49 which is being rotated.

Figure 4:
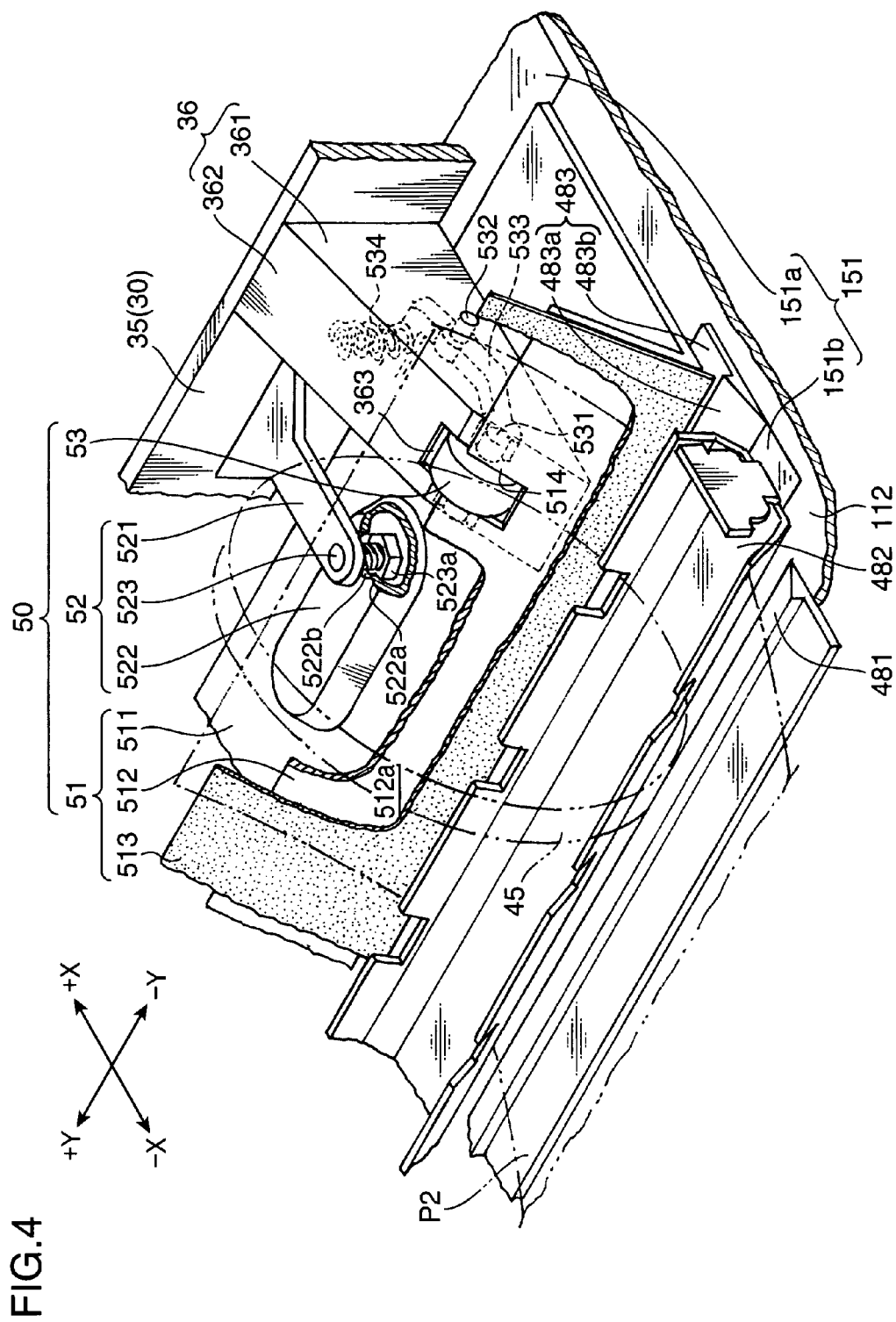
FIG. 4 is a partially cut-away enlarged perspective view showing a document leading mechanism in the automatic document feeder according the embodiment.
Figure 5:
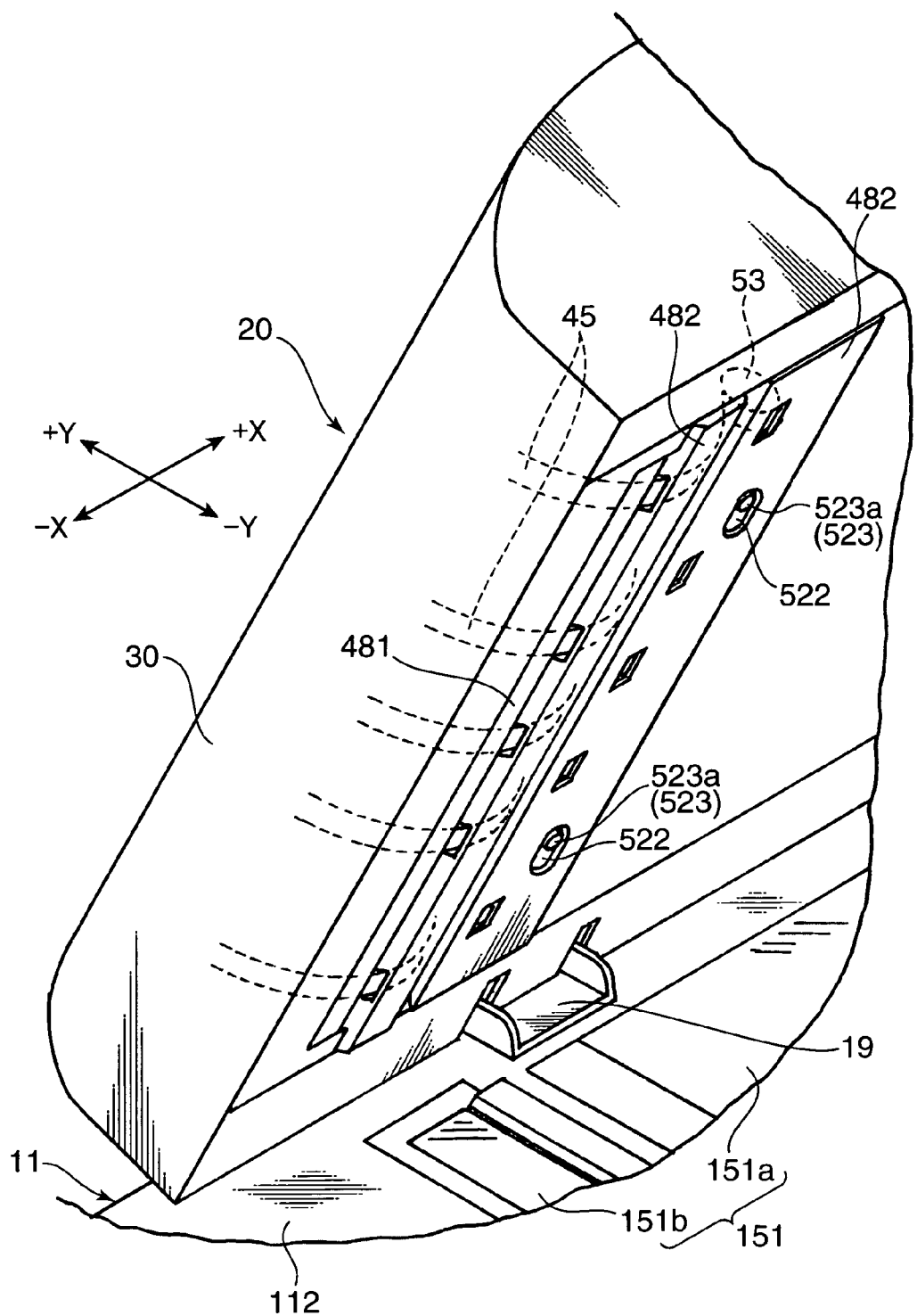
FIG. 5 is a perspective view showing the document leading mechanism in FIG. 4, when viewed from the side of a bottom surface of a housing.

The document leading mechanism 50 is disposed inside the case portion 33 of the housing 30 at a position on a right and lower side relative to the registration roller 45. FIG. 4 is a partially cut-away enlarged perspective view showing the document leading mechanism 50, and FIG. 5 is a perspective view showing the document leading mechanism 50, when viewed from the side of a bottom surface of the housing 30. As with FIGS. 2A and 2B, in FIGS. 4 and 5, the X-X direction is defined as "lateral direction" (−X: "leftward" and +X: "rightward"), and the Y-Y direction is defined as "longitudinal direction" (−Y direction: "frontward" and +Y direction: "rearward").

As shown in FIG. 4, the document leading mechanism 50 comprises a leading member (movable member) 51 disposed to face a downstream edge (right edge) of the automatically-document-reading glass 151b, an up/down movement permitting member 52 adapted to permit an up/down movement of a distal edge (left edge) of the leading member 51 while restricting a horizontal movement of the leading member 51, and an extraction roller 53 (a part of second carrying mechanism) adapted to extract an auto-feed document P2 led by the leading member 51 while nipping the auto-feed document P2 in cooperation with the registration roller 45.

In this embodiment, as shown in FIG. 5, the up/down movement permitting member 52 is arranged in a number of two along the longitudinal direction, and the extraction roller 53 is arranged in a number of five along the longitudinal direction. This is one example of the arrangement of the up/down movement permitting members 52 and the extraction rollers 53, and the respective numbers of them may be appropriately set at optimal values depending on the situation.

The leading member 51 includes a flat plate 511, an inclined plate 512 and a film (film member) 513. The flat plate 511 is disposed to extend in the longitudinal direction in opposed relation to a region of the top plate 112 located between the document mounting glass 151a and the automatically-document-reading glass 151b. The inclined plate 512 is formed to extend rightwardly and obliquely upwardly from a left edge of the flat plate 511 so as to have a left surface serving as an inclined surface 512a for leading an auto-feed document P2. The film 513 is a synthetic resin film attached on the inclined surface 512a of the inclined plate 512.

In this embodiment, an inclination angle of the inclined plate 512 relative to the flat plate 511 is set at about 60°. This inclination angle may be appropriately set at an optimal value depending on the situation.

The film 513 is formed to have a vertical width dimension greater than that of the inclined plate 512, and attached to have a lower edge slightly protruding downwardly from a lower edge of the inclined plate 512. This allows the lower edge of the film 513 to come into contact with the top plate 112 of the apparatus body 11. The film 513 is also attached to have an upper edge protruding upwardly from an upper edge of the inclined plate 512 to a certain extent. This allows the film 513 to play a role of guiding a led auto-feed document P2 toward the catch tray 34.

The up/down movement permitting member 52 includes a bracket 521, a bulged portion 522 and a bolt (pivot member) 523. The bracket 521 is formed to protrude leftwardly from a given frame 35 which is formed integrally with and inside the housing 30 at a position opposed to a left edge of the document mounting glass 151a. The bulged portion 522 is formed to bulge a part of the flat plate 511 of the leading member 51 upwardly in opposed relation to the bracket 521. The bolt 523 is inserted through an oval-shaped hole 522b formed in a top wall 522a of the bulged portion 522, from below the top wall 522a, and an distal end of the bolt 523 is fixed to the bracket 521. The oval-shaped hole 522b is formed to have a long axis extending in the lateral direction.

The bolt 523 is formed to have a diameter dimension slightly less than a short axis of the oval-shaped hole 522b, so that the bolt 523 inserted through the oval-shaped hole 522b is restricted from moving in the longitudinal direction, and swingably moved about an appropriate portion of a head 523a of the bolt 523 and along a laterally-extending vertical surface of the oval-shaped hole 522b. This means that a lower edge of the film 513 is swingingly moved in an upward/downward direction about a support point defined by an appropriate portion of the head 523a.

The extraction roller 53 is disposed inside and mounted to a holder 36 protruding leftward from the frame 35. This holder 36 has a pair of front and rear sidewalls 361 each having an approximately triangular shape, and an inclined top wall 362 which is bridged between respective upper edges of the sidewalls 361 and formed to extend leftwardly and obliquely downward. A support shaft 532 is attached across respective approximately-central regions of the sidewalls 361, and a fork-shaped roller support arm 533 is swingably mounted to the support shaft 532. The extraction roller 53 has a roller shaft 531 mounted to a left end of the roller support arm 533. In this manner, the extraction roller 53 can be rotated about the roller shaft 531 at the left end of the roller support arm 533. The inclined top wall 362 is formed with a rectangular window 363 at a position opposed to the extraction roller 53, and the extraction roller 53 is disposed to have an outer peripheral surface partially protruding from the rectangular window 363.

Each of the inclined plate 512 of the leading member 51 and the film 513 has a cutout 514 formed by cutting out a portion thereof opposed to the extraction roller 53 from the upper edge thereof. Thus, the extraction roller 53 protrudes outside from the cutout 514 through the rectangular window 363, and faces the outer peripheral surface of the registration roller 45.

A compression coil spring 534 is disposed inside the holder 36 in such a manner as to be interposed between a portion of the roller support arm 533 located on a right side of the support shaft 532, and the inclined wall 362. According to a biasing force of the compression coil spring 534, the outer peripheral surface of the extraction roller 53 is brought into contact with the outer peripheral surface of the registration roller 45. Thus, when the registration roller 45 is drivingly rotated, the extraction roller 53 is drivenly rotated by the registration roller 45.

An upstream guide plate 481 is disposed inside the case portion 33 of the housing 30 at a position on a slightly leftward side relative to the automatically-document-reading glass 151b, to direct an auto-feed document P2 to the glass 151b. Further, a counter plate 482 is disposed immediately above the glass 151b, to allow an auto-feed document P2 to be opposed to a top surface of the glass 151b. Furthermore, a downstream guide plate 483 is disposed on an immediate downstream side of the glass 151*b*, to guide an auto-feed document P2 after passing above the glass 151*b*, to the leading member 51.

The downstream guide plate 483 has a document oblique portion 483*a* which extends obliquely downward toward the automatically-document-reading glass 151*b*, and a flat plate portion 483*b* which extends from a downstream edge (right edge) of the document oblique portion 483*a* in a downstream direction, and extends in the longitudinal direction. The flat plate portion 483*b* is a member formed to provide a flat surface at a height position lower than that of the downstream edge of the document oblique portion 483*a*, and thereby a step is formed between a left edge of the flat plate portion 483*b* and the downstream edge of the document oblique portion 483*a*. Further, the flat plate portion 483*b* is formed to have a lateral width dimension allowing a right edge thereof to be located on a rightward side relative to the left edge of the leading member 51.

In the state after the housing 30 is set at the fully-closed position S1 (FIG. 2A), as shown in FIG. 4, the lower edge of the film 513 and the left edge of the flat plate 511 are landed on the flat plate portion 483*b*, and thereby the left edge of the leading member 51 is stopped at a height position lower than that of the downstream edge of the document oblique portion 483*a*. This makes it possible to prevent a leading edge of an auto-feed document P2 from getting stuck on the leading member 51 so as to smoothly carry the auto-feed document P2. The presence of the upstream guide plate 481, the counter plate 482 and the downstream guide plate 483 allow an auto-feed document P2 to be reliably fed to the automatically-document-reading glass 151*b* and then reliably directed to the leading member 51.

Figure 6A:
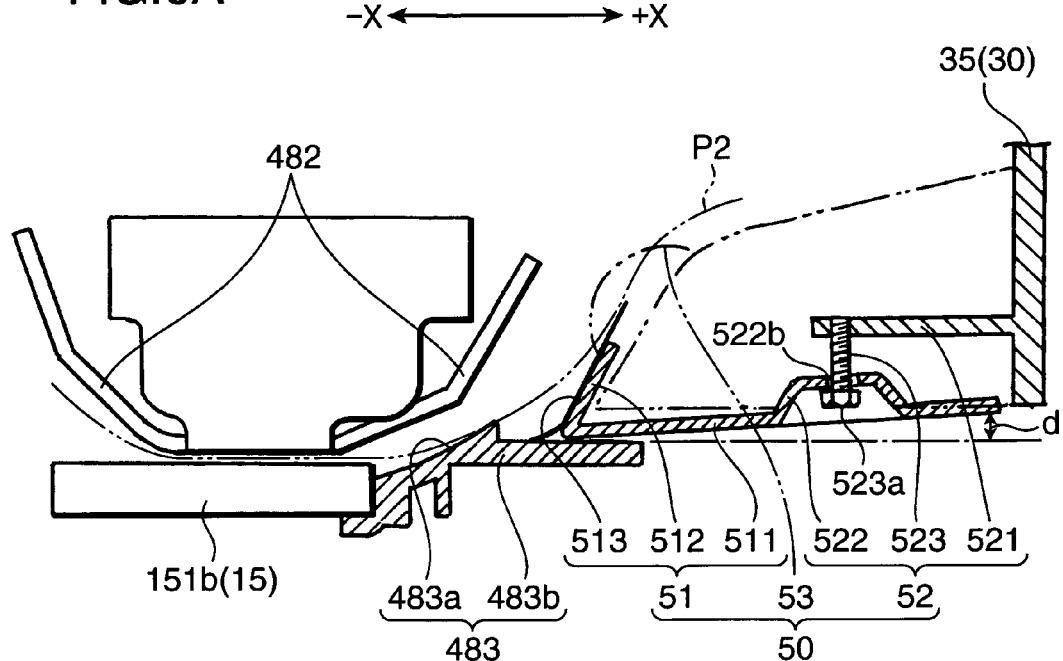
Figure 6B:
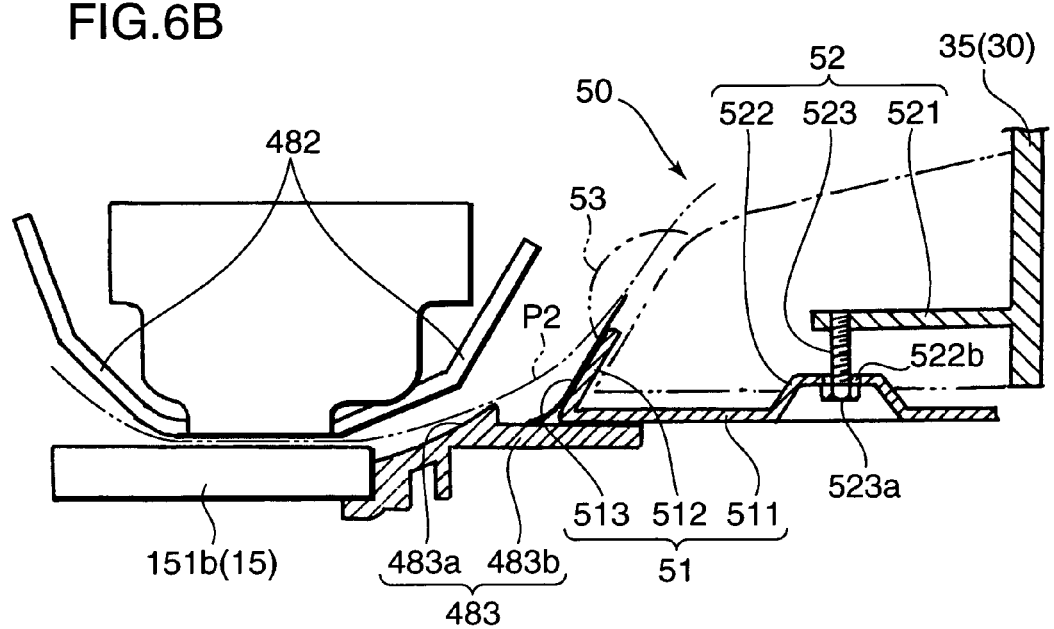

FIGS. 6A and 6B are explanatory diagrams of an operation of the document leading mechanism 50, wherein FIG. 6A shows the leading member 51 which is positioned relative to the downstream guide plate 483 in a normal state, and FIG. 6B shows the leading member 51 which is mounted at a position lower than a normal height level due to a mounting error of the leading member 51 or the housing 30, or another factor. As with FIGS. 2A and 2B, the X-X direction in FIGS. 6A and 6B is defined as follows: −X: "leftward" and +X: "rightward".

In a state when the leading member 51 is mounted at a normal height level, as shown in FIG. 6A, when the automatic document feeder 20 is set at the fully-closed position S1, the right edge of the leading member 51 is lifted from the same plane as the flat plate portion 483*b* of the downstream guide plate 483 by a distance "d". That is, the leading member 51 has a larger weight on a left side relative to the bolt 523, and therefore the left edge of the leading member 51 is brought into contact with and stopped by the top surface of the flat plate portion 483*b*. Further, a lower edge of the film 513 is elastically deformed in a downward concave shape and in close contact with the top surface of the flat plate portion 483*b*. Thus, in this state, an auto-feed document P2 fed toward the automatically-document-reading glass 151*b* is reliably led by the film 513 of the leading member 51 through the downstream guide plate 483.

In contrast, if the height level of the leading member 51 becomes lower than the normal height level, the conventional automatic document feeder has a problem. For example, a factor causing such a lower height level includes fluctuation in a biasing force of bias means, such as a plate spring (not shown), associated with the hinge plates 19, pinching of foreign matters between the bottom plate 31 of the housing 30 and the top plate 112 of the apparatus body 11, and dimensional errors or mounting errors during manufacturing. The above problem is that, when the automatic document feeder 20 is fully closed, the lower edge of the inclined plate 512 of the leading member 51 collides with the flat plate portion 483*b* of the downstream guide plate 483 to cause damages in the leading member 51 or the downstream guide plate 483.

In the automatic document feeder 20 according to this embodiment, as shown in FIG. 6B, the leading member 51 is hung by the head 523*a* of the bolt 523 mounted to the bracket 521 of the frame 35. Thus, after the left edge of the leading member 51 comes into contact with the flat plate portion 483*b* of the downstream guide plate 483, the leading member 51 is swingingly moved in a clockwise direction about the head 523*a* of the bolt 523. This makes it possible to solve the problem due to dimensional errors or mounting errors in the document leading mechanism 50 or the housing 30, and eliminate the problem, such as damages in the leading member 51 or the downstream guide plate 483.

Even if the height level of the leading member 51 conversely becomes higher than the normal height level, the leading member 51 having a left region with a larger weight than that of a right region will be swingably moved in a counter clockwise direction about a support point defined by an appropriate portion of the head 523*a*, to simply lift the right edge of the flat plate 511 of the leading member 51 relative to the apparatus body 11 by a distance greater than the distance "d". That is, no change occurs in the contact state of the left edge of the leading member 51 with the downstream guide plate 483, and therefore an auto-feed document P2 can be reliably led by the leading member 51.

Thus, a problem that an auto-feed document P2 after passing above the downstream guide plate 483 gets into under the leading member 51 to preclude the auto-feed document P2 from being led by the leading member 51 will never occur.

As described in detail, in the automatic document feeder 20 according to this embodiment, a pickup roller 41 for feeding an auto-feed document P2 toward the top surface of the automatically-document-reading glass 151*b* of the image forming apparatus, and the document leading mechanism 50 for leading up the auto-feed document P2 which has reached the glass 151*b*, are provided in the housing 30 adapted to be selectively opened and closed relative to the glass 151*b*. The auto-feed document P2 fed onto the glass 151*b* by driving of the pickup roller 41 is subjected to the operation of sequentially reading image information by the optical system unit 152. Then, the auto-feed document P2 is led up by the document leading mechanism 50, and ejected to the catch tray 34.

The document leading mechanism 50 is designed to maintain the inclined plate (inclined surface) 512 of the leading member 51 directed to the automatically-document-reading glass 151*b*, at a constant height level relative to the glass 151*b* in the state after the housing 30 is fully closed relative to the glass 151*b*. Specifically, even if the housing 30 set at the fully-closed position to cover the glass 151*b* is not located at a normal height level due to conditions of the springs associated with the hinge plates 19, pinching of foreign matters, dimensional errors or another factor, a height level of the distal edge of the up/down movement permitting member 52 of the leading member 51 relative to the glass 151*b* will never be changed. Thus, an auto-feed document P2 after passing above the glass 151*b* can be adequately led up by the document leading mechanism 50 adequately and constantly to reliably prevent occurrence of defective reading of the auto-feed document P2.

Further, when the leading member 51 comes into contact with the flat plate portion 483*b* of the downstream guide plate 483, the leading member 51 can be is swingingly moved to prevent overload which would otherwise be imposed thereon.

This makes it possible to reliably prevent occurrence of the problem due to the overload, such as damages in the leading member 51 or the downstream guide plate 483.

In the document leading mechanism 50 including the leading member 51 which has the upwardly-extending inclined surface 512a disposed to face the downstream edge of the automatically-document-reading glass 151b, and the up/down movement permitting member 52 adapted to permit an up/down movement of the distal edge while restricting a horizontal movement of the leading member 51, an auto-feed document P2 after passing above the glass 151b is led up by the leading member 51 having the upwardly-extending inclined surface 512a disposed to face the downstream edge of the automatically-document-reading glass 151b, and ejected through the inclined surface 512a. Further, the up/down movement permitting member 52 allows the distal edge of the inclined surface 512a to be moved up and down while being restricted in horizontal movement, so that the leading member 51 can constantly face a leading edge of an auto-feed document P2 after passing above the glass 151b, to reliably lead up the auto-feed document P2.

The up/down movement permitting member 52 further includes the bolt 523 having the head 523a which swingably supports the leading member 51. Thus, if the lower edge of the inclined surface 512a interferes with the top surface of the apparatus body 11 mounting thereon the glass 151b when the housing 30 is fully closed, the lower edge of the inclined surface 512a can be swingingly moved about a support point of the bolt 523. This makes it possible to maintain the lower edge of the inclined surface 512a of the leading member 51 at an adequate height level relative to the glass 151b.

The housing 30 is further provided with the extraction roller 53 and the ejection roller 49 for discharging an auto-feed document P2 led up by the document leading mechanism 50. Thus, the auto-feed document P2 led up by the document leading mechanism 50 can be discharged constantly and adequately.

The present invention is not limited to the above embodiment. For example, the following modifications may be made therein.

(1) In the above embodiment, a copy machine has been shown as the image forming apparatus 10 using the automatic document feeder 20. The present invention is not limited thereto, but may be applied to a facsimile machine and a scanner.

(2) In the above embodiment, the up/down movement permitting member 52 is made up of the bracket 521 formed to protrude from the frame 35, the bulged portion 522 bulgingly formed in the flat plate 511 of the leading member 51, and the bolt 523 interposed between the bulged portion 522 and the bracket 521, so as to allow the leading member 51 to be swingingly moved about the head 523a of the bolt 523. Alternatively, a parallel up/down movement guide member, such as a guide rail for guiding a parallel movement of the leading member 51 in an upward/downward direction, may be provided to allow the leading member 51 to be moved up and down based on guide of the guide member. In this case, if the leading member 51 interferes with the top surface of the apparatus body 11 mounting thereon the glass 151b when the housing 30 is fully closed, the leading member 51 can be moved up and down while being guided by the parallel up/down movement guide member so as to maintain the leading member 51 at an adequate height level.

(3) The above embodiment is designed such that a region (distal edge region) of the leading member 51 on the side of the film 513 receives a downward force about the bolt 523 based on its own weight. Alternatively, given bias means, such as a coil spring, may be interposed, for example, between the bracket 521 and the leading member 51, to apply a biasing force of the bias means to the leading member 51 in such a manner as to move the distal edge region of the leading member 51 downwardly.

(4) The above embodiment is designed such that the film 513 is curved in a downward concave shape when the distal edge of the leading member 51 is in contact with the flat plate portion 483b of the downstream guide plate 483. Alternatively, a film having relatively high bending strength may be employed as the film 513 to allow a distal edge of the film to serve as the distal edge of the leading member (movable member) 51 in the present invention.

Figure 7:
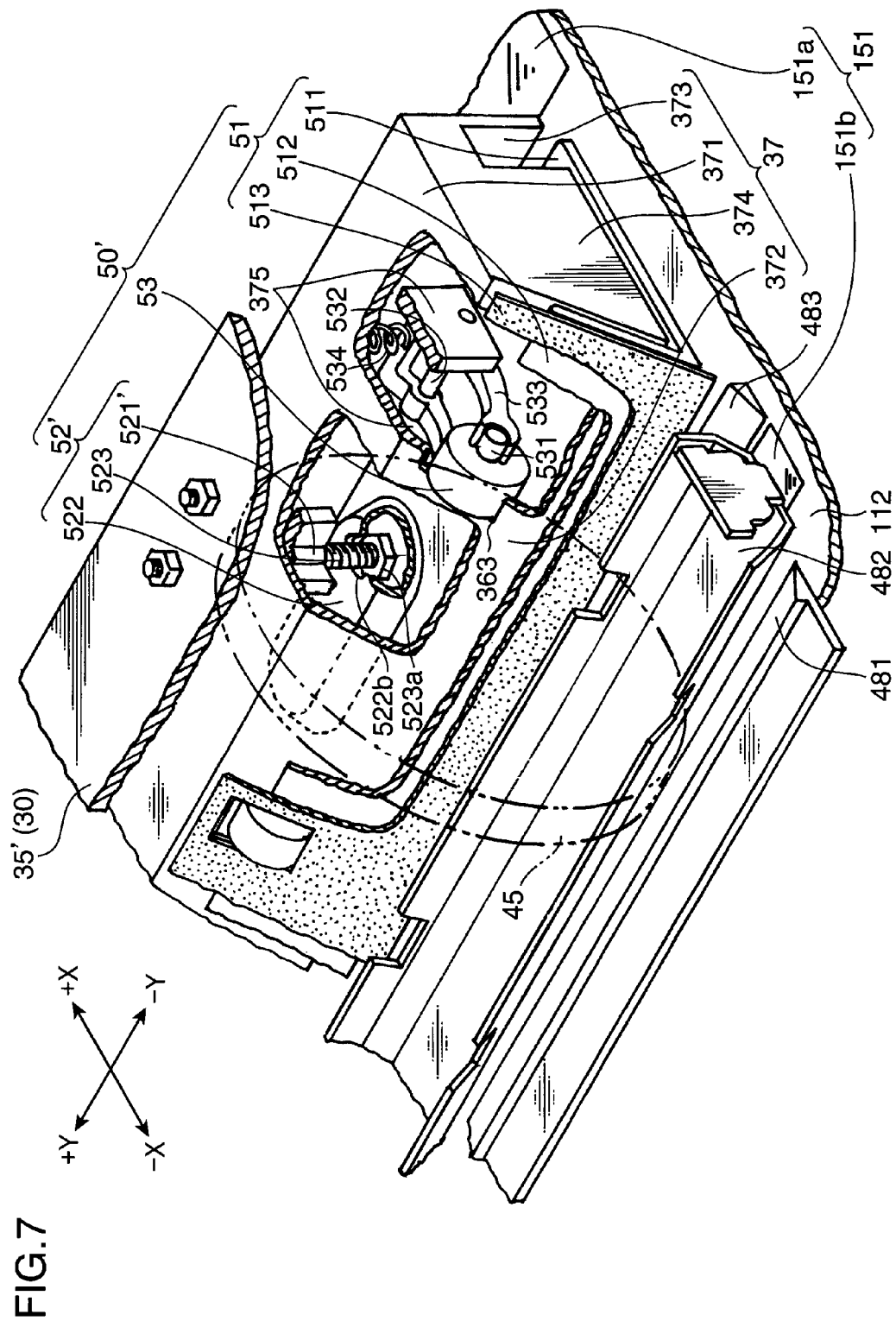
FIG. 7 is a partially cut-away enlarged perspective view showing one example of modification of the document leading mechanism.

(5) FIG. 7 is a partially cut-away enlarged perspective view showing a document leading mechanism 50' as one example of modification of the document leading mechanism 50. As with FIGS. 2A and 2B, in FIG. 7, the X-X direction is defined as "lateral direction" (−X: "leftward" and +X: "rightward"), and the Y-Y direction is defined as "longitudinal direction" (−Y direction: "frontward" and +Y direction: "rearward"). In place of the plurality of holders 30 used for the extraction rollers 53 in the aforementioned embodiment, this document leading mechanism 50' employs a large holder 37 made of a synthetic resin and designed to receive therein a plurality of extraction rollers 53. This point is one difference with the document leading mechanism 50 in the aforementioned embodiment.

The large holder 37 comprises a top wall 371 fastened to a frame 35 of a housing 30 by a bolt, a left inclined wall 372 which extends leftward and obliquely downward from a left edge of the top plate 371 and along a back surface of the inclined plate 521 of the leading member 51, a right vertical wall 373 which extends vertically downward from a right edge of the top plate 371, and a pair of front and rear side walls 374 which extend vertically downward from front and rear edges of the top plate 371, respectively. The large holder 37 has a bottom surface which is opened.

In connection with replacing the small holders 36 in the aforementioned embodiment with the large holder 37, the document leading mechanism 50' employs some structures including different detailed portions from those in the aforementioned embodiment. Firstly, while the frame 35 supporting the document leading mechanism 50 in the aforementioned embodiment has a vertically-extending support surface, a frame 35' having a horizontally-extending support surface is employed in this modification. Thus, a top surface of the top wall 371 is brought into close contact with a bottom surface of the frame 35', and the top wall 371 and the frame 35' are fastened together by a bolt to integrate the large holder 37 with the housing 30 through the frame 35'.

Secondly, in the aforementioned embodiment, the support shaft 532 for supporting the roller support arm 533 is inserted into and supported by the side wall of the holder 36. Differently, in this modification, a pair of front and rear vertical plates 375 are formed to extend vertically downward from the top wall 371, and a support shaft 532 is attached across the pair of the vertical plates 375.

Thirdly, in the aforementioned embodiment, the up/down movement permitting member 52 is made up of the bracket 521 formed to protrude from the frame 35, the bolt 523 screwed in a distal end of the bracket 521 from below, and the bulged portion 522 formed in the leading member 51 to allow the bolt 523 to penetrate therethrough. Differently, in this modification a nut member 521' protruding downward from the top wall 371 of the large holder 37 is employed in place of the bracket 521 to provide an up/down movement permitting member 52, and a bolt 523 is screwed in the nut member 521'.

Other structures and functions of the document leading mechanism 50' are the same as those of the document leading mechanism 50 in the aforementioned embodiment. In particular, the use of the large holder 37 makes it possible to integrally attach the document leading mechanism 50' to the housing 30 only by fixing the large holder 37 to the frame 35'. Thus, as compared with a structure required to fix a plurality of holder 36 to a frame 35 one-by-one by welding or the like as in the aforementioned embodiment, the large holder 37 makes it possible to reduce a process time of assembling so as to achieve reduction in assembling cost.

In the above specific embodiment and modifications include the following inventions.

An automatic document feeder according to one aspect of the present invention comprises a first carrying mechanism for feeding a document toward a document read surface, a document leading mechanism for leading up the document after passing above the document read surface, a second carrying mechanism for carrying the document led by the document leading mechanism, in a downstream direction, and a housing equipped with the first carrying mechanism, the document leading mechanism and the second carrying mechanism, and adapted to be selectively opened and closed relative to the document read surface. The document leading mechanism includes a movable member having an inclined surface which extends obliquely downward in such a manner as to direct a distal edge thereof toward the document read surface. The movable member is adapted to maintain the distal edge of the inclined surface at a substantially constant height level relative to the document read surface.

An image forming apparatus according to another aspect of the present invention comprises an apparatus body including a contact glass serving as a document read surface, and an automatic document feeder for automatically feeding a document to the contact glass. This automatic document feeder includes the above features.

According to this automatic document feeder or image forming apparatus, the document leading mechanism includes a movable member having an inclined surface which extends obliquely downward in such a manner as to direct a distal edge toward the document read surface (contact grass), and the movable member is adapted to be moved so as to maintain the distal edge of the inclined surface at a substantially constant height level relative to the document read surface. Thus, a document after passing the document read surface can be led up by the distal edge of the movable member adequately and constantly to reliably prevent occurrences of defective reading of the document and a problem that the document after a reading operation is not adequately carried. Further, the document leading mechanism can effectively prevent damages in the movable member or a related component of the apparatus body, due to overload occurring when the movable member comes into contact with the apparatus body.

In the above automatic document feeder or image forming apparatus, preferably, the movable member is swingably supported about a given support point while allowing the inclined surface to extend obliquely downward. In particular, it is preferable that the above automatic document feeder or image forming apparatus further comprises an up/down movement permitting member adapted to permit an up/down movement of the distal edge while restricting a horizontal movement of the movable member.

According to this feature, the movable member can be swingingly moved about the support point to allow the distal edge of the inclined surface of the movable member directed to a downstream edge of the document read surface to be maintained at a predetermined height level relative to the document read surface. Thus, a document after passing above the document read surface can be highly reliably led up by the inclined surface of the movable member through the distal edge thereof.

In the above automatic document feeder or image forming apparatus, preferably, the distal edge of the inclined surface is a distal edge of a film member which is held on the inclined surface in such a manner as to protrude downwardly by a given distance.

According to this feature, a document can be reliably led up by the distal edge of the film member as the distal edge of the inclined surface of the movable member.

In the above automatic document feeder or image forming apparatus, the movable member preferably includes a flat plate, an inclined plate extending obliquely upward from one edge of the flat plate, and a flexible film attached to the inclined plate in such a manner as to have a lower edge protruding downwardly relative to a lower edge of the inclined plate. The flexible film is adapted, when the lower edge of the inclined plate comes into contact with a given flat contact surface, to be elastically deformed so as to allow a lower edge thereof to come into contact with the flat contact surface.

Preferably, the above automatic document feeder or image forming apparatus further comprises a guide plate disposed between the document read surface and the document leading mechanism and adapted to guide a document after passing above the document read surface, to the document leading mechanism.

More preferably, this automatic document feeder or image forming apparatus further comprises a oblique portion which extends obliquely downward toward the document read surface, and a flat plate portion which extends from a lower height position relative to a downstream edge of the oblique portion, horizontally in a downstream direction for carrying the document, to provide the flat contact surface for the lower edge of the inclined plate and the lower edge of the flexible film.

According to the above features, a document can be reliably guided toward the document leading mechanism.

This application is based on patent application No. 2005-378605 filed in Japan, the contents of which are hereby incorporated by references.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds are therefore intended to embraced by the claims.

What is claimed is:

1. An image reading apparatus comprising:
   an apparatus body including a contact glass serving as a document read surface; and
   an automatic document feeder for automatically feeding a document to said contact glass, said automatic document feeder including:
   a first carrying mechanism for feeding a document toward said contact glass;
   a document leading mechanism for leading up the document after passing above said contact glass;
   a second carrying mechanism for carrying the document led by said document leading mechanism, in a downstream direction; and a housing equipped with said first carrying mechanism, said document leading mechanism and said second carrying mechanism, and the housing being movably mounted on the apparatus body so that the housing is adapted to be selectively opened and closed relative to said contact glass, wherein the housing has a rectangular shape having a front end and a rear end spaced apart along a longitudinal direction, and is swingably moved about a pivot axis at the rear end, the pivot axis extending in a direction parallel to a transport direction of the document, and a position of the housing is changeable between a closed position where the document read surface is covered and an opened position where the front end is lifted upward by a swinging movement about the pivot axis, and wherein the apparatus body includes a guide plate disposed downstream of the contact glass for guiding a document after passing above said contact glass to said document leading mechanism, said document leading mechanism of the automatic document feeder includes a movable member disposed downstream of the contact glass and a plurality of pivot members disposed in the housing downstream of the contact glass, the movable member includes a plurality of supported portions disposed side by side in forward and rearward directions of the housing, the pivot members are disposed respectively corresponding to the supported portions, the pivot members swingably support the supported portions independently of each other, and the movable member has a first inclined surface which extends obliquely downward in such a manner as to direct a distal edge thereof toward said contact glass, the guide plate of the apparatus body includes a second inclined surface that extends obliquely downward toward said contact glass, the guide plate further including a first flat plate extending in a downstream direction from a lower height position relative to a downstream edge of the second inclined surface, and disposed to be contacted by the distal edge of the first inclined surface when the housing is in a closed position relative to the contact glass of the apparatus body so that the first inclined surface of the movable member continues downstream of the second inclined surface of the guide plate of the apparatus body when the distal edge of the first inclined surface is in contact with the first flat plate of the guide plate.

2. The image reading apparatus as defined in claim 1, wherein the housing further comprises a frame, the pivot members being on a part of the frame downstream of said contact glass, wherein said movable members is respectively swingably supported about the plurality of the pivot members on the frame as supports points while allowing said first inclined surface to extend obliquely downward.

3. An image reading apparatus as defined in claim 2 wherein the movable member is rotatably supported for rotation about an axis extending substantially transverse to the document feeding direction.

4. An image reading apparatus as in claim 2, wherein the movable member is rotatably supported so that the first inclined surface is movable toward and away from the contact glass when the housing is closed relative to said contact glass.

5. The image reading apparatus as defined in claim 1, further comprising a film member held on said first inclined surface, wherein a distal edge of said film member is protruded by a given distance from the distal edge of said first inclined surface.

6. The image reading apparatus of claim 1, wherein the movable member is hung from the pivot members so that each of the supported portions of the movable member is movable independently relative to the respective pivot members.

7. An image reading apparatus comprising:

an apparatus body including a contact glass serving as a document read surface; and an automatic document feeder for automatically feeding a document to said contact glass, said automatic document feeder including:

a first carrying mechanism for feeding a document toward said contact glass;

a document leading mechanism for leading up the document after passing above said contact glass;

a second carrying mechanism for carrying the document led by said document leading mechanism, in a downstream direction; and a housing equipped with said first carrying mechanism, said document leading mechanism and said second carrying mechanism, and the housing being movably mounted on the apparatus body so that the housing is adapted to be selectively opened and closed relative to said contact glass, wherein the apparatus body includes a guide plate disposed downstream of the contact glass for guiding a document after passing above said contact glass to said document leading mechanism, said document leading mechanism of the automatic document feeder includes a movable member disposed downstream of the contact glass, the movable member being movable about pivot member provided in the housing downstream of said contact glass and having a first inclined surface which extends obliquely downward in such a manner as to direct a distal edge thereof toward said contact glass, the guide plate of the apparatus body includes a second inclined surface that extends obliquely downward toward said contact glass, the guide plate further including a first flat plate extending in a downstream direction from a lower height position relative to a downstream edge of the second inclined surface, and disposed to be contacted by the distal edge of the first inclined surface when the housing is in a closed position relative to the contact glass of the apparatus body so that the first inclined surface of the movable member continues downstream of the second inclined surface of the guide plate of the apparatus body when the distal edge of the first inclined surface is in contact with the first flat plate of the guide plate and wherein said movable member includes:

a second flat plate;

an inclined plate as said first inclined surface extending obliquely upward from one edge of said second flat plate; and a flexible film attached to said inclined plate in such a manner as to have a lower edge protruding downwardly relative to a lower edge of said inclined plate, said flexible film being configured to be deformed elastically by the first flat plate when the lower edge of said inclined plate comes into contact with said first flat plate.

8. An image reading apparatus, comprising:

an apparatus body including a contact glass defining as a document read surface; and an automatic document feeder for automatically feeding a document to said contact glass, said automatic document feeder including:

a first carrying mechanism for feeding a document toward said contact glass;

a document leading mechanism for leading up the document after passing above said contact glass;

a second carrying mechanism for carrying the document led by said document leading mechanism, in a downstream direction; and a housing equipped with said first carrying mechanism, said document leading mechanism and said second carrying mechanism, and the housing being movably mounted on the apparatus body so that the housing is adapted to be selectively opened and closed relative to said contact glass, wherein the apparatus body includes a guide plate disposed downstream of the contact glass for guiding a document after passing above said contact glass to said document leading mechanism, said guide plate includes a guiding inclined surface that extends obliquely down toward the contact glass and a guiding flat plate horizontally extending in the downstream direction relative to a document feeding direction from a lower height position relative to a downstream edge of said guiding inclined surface, the document leading mechanism including a movable member disposed downstream of the contact glass and having a movable member flat plate, a movable member inclined plate extending obliquely up from a distal edge of said movable member flat plate and so that a lower edge of the movable member inclined plate is directed toward the contact glass and a flexible film attached to said movable member inclined plate in such a manner as to have a lower edge of the flexible film protruding downwardly relative to the lower edge of said movable member inclined plate, the lower edge of said flexible film and the lower edge of said movable member inclined plate coming into contact with said guiding flat plate when the housing is in a closed position relative to the contact glass so the flexible film is elastically deformed, whereby said guiding flat plate defines a contact portion for the lower edge of said movable member inclined plate and the lower edge of said flexible film.

9. An image reading apparatus as defined in claim 8, wherein all of the flexible film is disposed downstream of the second inclined surface formed on the guide plate.

10. An image reading apparatus comprising:

an apparatus body including a contact glass defining a document read surface;

a housing movably mounted on the apparatus body and adapted to be selectively opened and closed relative to the contact glass;

a carrying mechanism in the housing for feeding a document passed the contact glass;

a guide plate mounted to the apparatus body downstream of the contact glass and having an inclined surface that extends obliquely down toward the contact glass for guiding a document after passing above the contact glass, the guide plate further having a flat surface on a side of the inclined surface opposite the contact glass, said flat surface extending horizontally in a downstream direction relative to a document feeding direction from a lower height position relative to a downstream edge of said inclined surface; and a document leading mechanism in the housing for leading the document after passing above the contact glass and beyond the inclined surface of the guide plate, the document leading mechanism including a movable member having a flat plate, an inclined plate extending obliquely up from one edge of the flat plate and a flexible film attached to the inclined plate so that a lower edge of the flexible film protrudes down relative to a lower edge of the inclined plate, the flexible film being dimensioned so that a lower edge of the flexible film contacts the flat surface of the guide plate and elastically deforms when the housing is closed relative to the contact glass.

* * * * *